United States Patent
Stack et al.

(10) Patent No.: US 7,818,606 B1
(45) Date of Patent: Oct. 19, 2010

(54) METHODS AND APPARATUS FOR SWITCH-INITIATED TRESPASS DECISION MAKING

(75) Inventors: Daniel Stack, Marlborough, MA (US); Ashish Palekar, Franklin, MA (US); Dave Harvey, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 444 days.

(21) Appl. No.: 11/972,157

(22) Filed: Jan. 10, 2008

Related U.S. Application Data

(60) Provisional application No. 60/999,754, filed on Sep. 28, 2007.

(51) Int. Cl.
 *G06F 11/00* (2006.01)
(52) U.S. Cl. .................... 714/4; 709/223; 709/224
(58) Field of Classification Search ............ 714/4
 See application file for complete search history.

(56) References Cited

U.S. PATENT DOCUMENTS

| | | | |
|---|---|---|---|
| 6,763,479 B1 * | 7/2004 | Hebert | 714/4 |
| 6,904,542 B2 * | 6/2005 | Ryhorchuk et al. | 714/27 |
| 6,981,174 B1 * | 12/2005 | Hanning | 714/5 |
| 7,114,096 B2 * | 9/2006 | Freimuth et al. | 714/13 |
| 7,318,138 B1 * | 1/2008 | Usgaonkar et al. | 711/163 |
| 7,383,472 B2 * | 6/2008 | Miura | 714/42 |
| 2006/0047850 A1 * | 3/2006 | Singh Bhasin et al. | 709/238 |
| 2006/0203715 A1 * | 9/2006 | Hunter et al. | 370/216 |
| 2006/0206602 A1 * | 9/2006 | Hunter et al. | 709/223 |
| 2007/0041373 A1 * | 2/2007 | Lor et al. | 370/356 |
| 2007/0180287 A1 * | 8/2007 | Kumar et al. | 714/4 |
| 2008/0215910 A1 * | 9/2008 | Gabriel et al. | 714/4 |
| 2010/0077067 A1 * | 3/2010 | Strole | 709/223 |

* cited by examiner

*Primary Examiner*—Scott T Baderman
*Assistant Examiner*—Kamini Patel
(74) *Attorney, Agent, or Firm*—Daly, Crowley, Mofford & Durkee, LLP

(57) ABSTRACT

Methods and apparatus for generating switch-initiated trespass commands. In an exemplary embodiment, a method includes recognizing that a first switch has a first path to a first target, which is coupled to a logical unit, and a second path to a second target, recognizing that a second switch has a first path to the first target and a second path to the second target, the second target being coupled to the logical unit, and determining whether the first switch should issue a trespass command.

20 Claims, 12 Drawing Sheets

METHODS AND APPARATUS FOR SWITCH-INITIATED TRESPASS DECISION MAKING

CROSS-REFERENCE TO RELATED APPLICATIONS

The present application claims the benefit of U.S. Provisional Patent Application No. 60/999,754, filed on Sep. 28, 2007, which is incorporated herein by reference.

BACKGROUND

As is known in the art, computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

To leverage the value of MSS, these are typically networked in some fashion, Popular implementations of networks for MSS include network attached storage (NAS) and storage area networks (SAN). In NAS, MSS is typically accessed over known TCP/IP lines such as Ethernet using industry standard file sharing protocols like NFS, HTTP, and Windows Networking. In SAN, the MSS is typically directly accessed over Fibre Channel switching fabric using encapsulated SCSI protocols. While each network type has its advantages and disadvantages, SANs are particularly noted for providing the advantage of being reliable, maintainable, and being a scalable infrastructure. Centralized control over switches and other resources can consume large amounts of processing power.

SUMMARY

The present invention provides methods and apparatus for controlling the generation of trespass commands by switches in networks having intelligent switches coupled to targets via a series of paths, which can be active or passive. A tie-breaker mechanism prevents a 'ping-ponging' of path configurations due to excessive trespass commands. With this arrangement, the switches can gracefully generate trespass commands in response to path connectivity losses.

In one aspect of the invention, a method includes a method comprising recognizing that a first switch has a first path to a first target, which is coupled to a logical unit, and a second path to a second target, recognizing that a second switch has a first path to the first target and a second path to the second target, the second target being coupled to the logical unit, wherein in a first state the first path from the first switch to the first target is active, the second path from the first switch to the second target is passive, the first path from the second switch to the first target is active and the second path from the second switch to the second target is passive. The method further includes identifying to the first and second switches that the first target is a default owner for the logical unit, determining that the first path from the first switch to the first target is lost, determining that the first switch should issue a trespass command to the second target for that the first paths to the first target become inactive and the second paths to the second target become active, generating a trespass window from the trespass command, determining that the second path from the second switch to the second target is lost, and determining whether the first switch should issue a trespass command to the second target based upon whether the trespass window is expired and the identify of the default owner.

The method can further include one or more of the following features: determining whether a central controller should generate a push command in response to one or more conditions, the one or more conditions includes the first and second switches having no operating paths to both active and passive targets, and/or all paths to active paths have failed, the first switch informs the central controller as the first switch enters and leave states including no paths, no active paths, and at least one active paths, the central controller issues a push command including commands to the first and second switches to perform a trespass, the trespass window includes a time duration greater than a time expected to effect a trespass command, the first target includes a SCSI target, the first target includes a storage processor, the default owner is set by a storage administrator, communicating to the first switch that the first target is the default owner, recording a current time as a starting point for the trespass window in response to a first one of receiving an acknowledgement a trespass command has been successfully completed and detecting a different switch has issued a trespass command, and prior to generating the push, detecting that the first switch has no active paths and polling to determine whether the passive second target has become active, and polling to determine if the first switch has a connection to a lost target.

In another aspect of the invention, a system comprises a first switch having a first path to a first target, which is coupled to a logical unit, and a second path to a second target, a second switch having a first path to the first target and a second path to the second target, the second target being coupled to the logical unit, wherein in a first state the first path from the first switch to the first target is active, the second path from the first switch to the second target is passive, the first path from the second switch to the first target is active and the second path from the second switch to the second target is passive, wherein the first and second switches are capable of recognizing that the first target is a default owner for the logical unit, that the first path from the first switch to the first target is lost, that the first switch should issue a trespass command to the second target for that the first paths to the first target become inactive and the second paths to the second target become active, that the second path from the second switch to the second target is lost, and whether the first switch should issue a trespass command to the second target based upon whether a trespass window is expired and the identify of the default owner.

In a further aspect of the invention, an article comprises a storage medium having stored thereon instructions that when executed by a machine result in the following: recognizing that a first switch has a first path to a first target, which is coupled to a logical unit, and a second path to a second target, recognizing that a second switch has a first path to the first target and a second path to the second target, the second target being coupled to the logical unit, wherein in a first state the first path from the first switch to the first target is active, the second path from the first switch to the second target is passive, the first path from the second switch to the first target is active and the second path from the second switch to the second target is passive, identifying to the first and second switches that the first target is a default owner for the logical unit, determining that the first path from the first switch to the first target is lost, determining that the first switch should issue a trespass command to the second target for that the first paths to the first target become inactive and the second paths to the second target become active, generating a trespass window from the trespass command, determining that the second path from the second switch to the second target is lost, and determining whether the first switch should issue a trespass command to the second target based upon whether the trespass window is expired and the identify of the default owner.

BRIEF DESCRIPTION OF THE DRAWINGS

The foregoing features of this invention, as well as the invention itself, may be more fully understood from the following description of the drawings in which.

DETAILED DESCRIPTION

Figure 1:
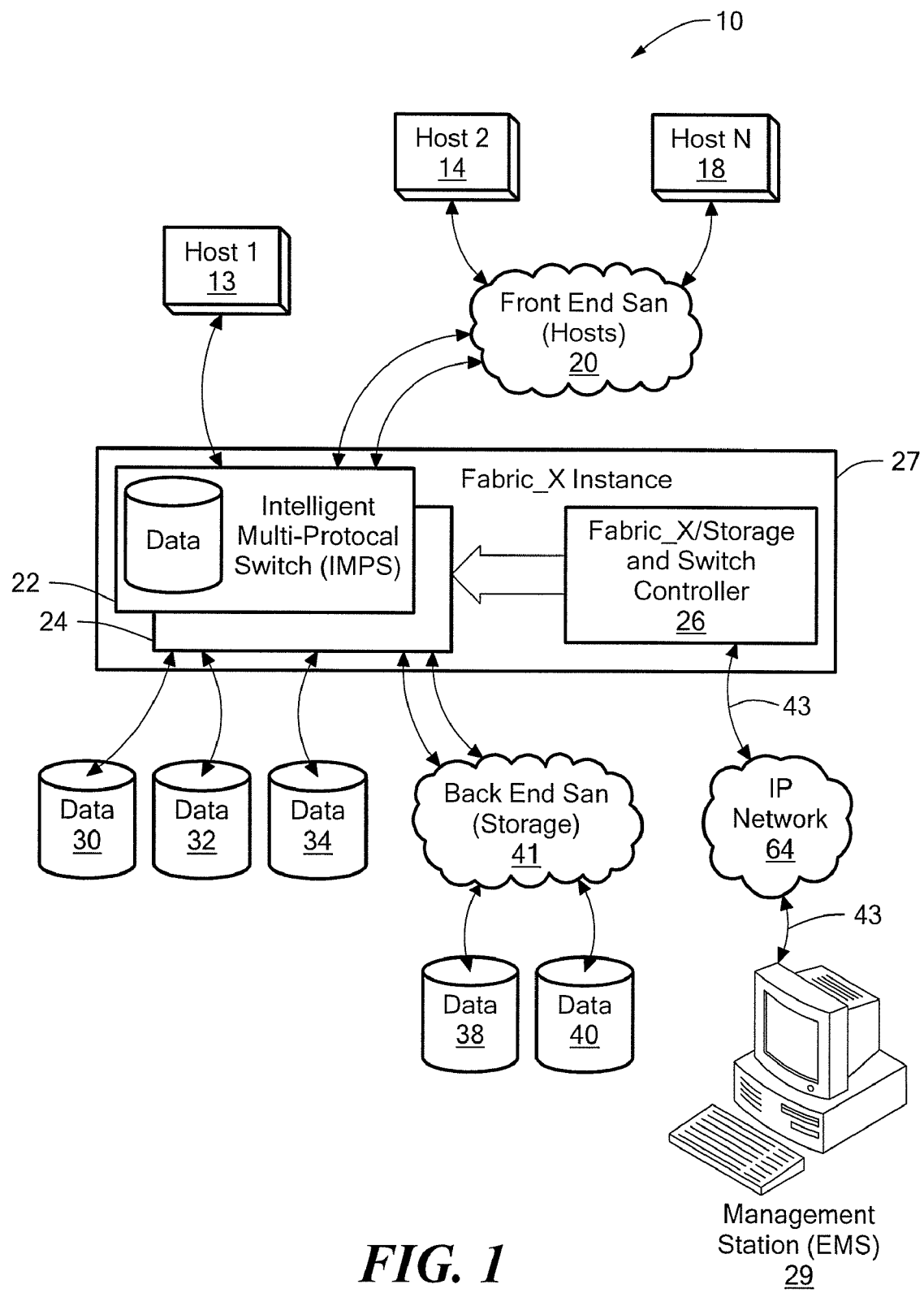
FIG. 1 is a block diagram showing a data storage environment including a new architecture embodying the present invention and which is useful in such an environment.

The present invention provides methods and apparatus for path control between switches and targets. In general, paths from switches to targets can be active or passive where a target is a storage processor, for example, for a given media, such as a disk array. In exemplary embodiments, an active target provides access to a logical unit. In the event of an active path failure, a trespass command can be given to a passive target instructing the passive target to become an active target for a given logical unit. Embodiments of the present invention manage trespass command issuance by the switches to prevent 'ping-ponging' of active/passive states.

Before describing exemplary embodiments of the invention in detail, an exemplary system is described of which the exemplary trespass command control can form a part. It is understood that methods and apparatus of the present invention are intended for use in Storage Area Networks (SANs) that include data storage systems, such as the EMC Invista system, Symmetrix Integrated Cache Disk Array system or the Clariion Disk Array system available from EMC Corporation of Hopkinton, Mass. and those provided by vendors other than EMC. It is further understood that while the invention embodiments are described in conjunction with certain architectures that may be described using certain vendor-specific terms, such description is not limiting on the invention, but rather is used to facilitate an understanding of the invention to one or ordinary skill in the art.

The methods and apparatus of this invention may take the form, at least partially, of program code (i.e., instructions) embodied in tangible media, such as floppy diskettes, CD-ROMs, hard drives, random access or read only-memory, or any other machine-readable storage medium, including transmission medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below.

Exemplary embodiments of the present invention are described in conjunction with a so-called FabricX or Invista architecture that allows storage administrators to manage the components of their SAN infrastructure without interrupting the services they provide to their clients. This provides for a centralization of management allowing the storage infrastructure to be managed without requiring host-based software or resources for this management. For example, data storage volumes can be restructured and moved across storage devices on the SAN while the hosts accessing these volumes continue to operate undisturbed. It is understood that the exemplary embodiments are not limited to any particular architecture or vendor, but rather the illustrative embodiments are intended to facilitate an understanding of the invention.

Such an architecture also allows for management of resources to be moved off of storage arrays themselves, allowing for more centralized management of heterogeneous data storage environments. Advantages provided include: (1) centralized management of a storage infrastructure; (2) storage consolidation and economical use of resources; (3) common replication and mobility solutions (e.g., migration) across heterogeneous storage subsystems; and (4) storage management that is non-disruptive to hosts and storage subsystems.

Referring now to FIG. 1, reference is now made to a data storage environment 10 including an architecture having the elements of the front-end storage area network 20 and a plurality of hosts 1-N shown as hosts 13, 14, and 18, wherein some hosts may communicate through the SAN and others may communicate in a direct connect fashion, as shown. The architecture includes two intelligent multi-protocol switches (IMPSs) 22 and 24 and storage and switch controller 26 to form a combination 27 which may also be denominated as a FabricX Instance 27. In communication with the Instance through an IP Network 64 and management interface 43 is an element management station (EMS) 29, and back-end storage network 42. Such back-end storage may include one or more storage systems, such as the EMC Clariion and Symmetrix data storage systems from EMC of Hopkinton, Mass.

Generally such a data storage system includes a system memory and sets of pluralities and of multiple data storage devices or data stores. The system memory can comprise a buffer or cache memory; the storage devices in the pluralities and can comprise disk storage devices, optical storage devices and the like. However, in exemplary embodiments the storage devices are disk storage devices. The sets represent an array of storage devices in any of a variety of known configurations. In such a data storage system, a computer or host adapter provides communications between a host system and the system memory and disk adapters and provides pathways between the system memory and the storage device pluralities. Regarding terminology related to a storage system, the host or host network is sometimes referred to as the front end and from the disk adapters toward the disks is sometimes referred to as the back end. Since the system can includes the ability to virtualize disks using LUNs as described below, a virtual initiator may be interchanged with disk adapters. A bus interconnects the system memory, and communicates with front and back end. As will be described below, providing such a bus with switches provides discrete access to components of the system.

The Data Storage Environment 10 provides an architecture that includes what has been described above as a FabricX Instance. Pairs of the IMPS switch are provided for redundancy; however, one skilled in the art will recognize that more or less switches and processors could be provided without limiting the invention and that the Controller could also be provided in redundancy. Storage from various storage subsystems is connected to a specific set of ports on an IMPS. As illustrated, the imported storage assets and these back-end ports make up the Back-End SAN 41 with a networked plurality of data storage arrays 38, and 40, and which also may be directly connected to either IMPS, as shown with arrays 30-34 so connected to the Instance 27 through IMPS 24, but although not shown could also be connected directly to the Storage and Switch Controller.

It is known in SAN networks using Fibre Channel and/or SCSI protocols that such data devices as those represented by disks or storage 30-40 can be mapped using a protocol to a Fibre Channel logical unit (LUN) that act as virtual disks that may be presented for access to one or more hosts, such as hosts 13-18 for I/O operations. LUNs are also sometimes referred to interchangeably with data volumes which at a logical level represent physical storage such as that on storage 30-40.

Over the IP Network 64 and by communicating through the management interface 43, a Storage Administrator using the EMS 29 may create virtual LUN's (Disks) that are composed of elements from the back-end storage. These virtual devices which may be represented, for example by a disk icon (not shown) grouped with the intelligent switch, are made available through targets created on a specific set of intelligent switch ports. Client host systems connect to these 'front-end' ports to access the created volumes. The client host systems, the front-end ports, and the virtual LUNs all form part of the Front-End SAN 20. Note Hosts, such as Host 13 may connect directly to the IMPS.

The combined processing and intelligence of the switch and the FabricX Controller provide the connection between the client hosts in the front-end SAN and the storage in the back-end SAN. The FabricX Controller runs storage applications that are presented to the client hosts. These include the Volume Management, Data Mobility, Snapshots, Clones, and Mirrors, which are terms of art known with EMC's Clariion data storage system. In one embodiment the FabricX Controller implementation is based on the CLARiiON Barracuda storage processor and the CLARiiON Flare software implementation which includes layered drivers that are discussed below.

Figure 2:
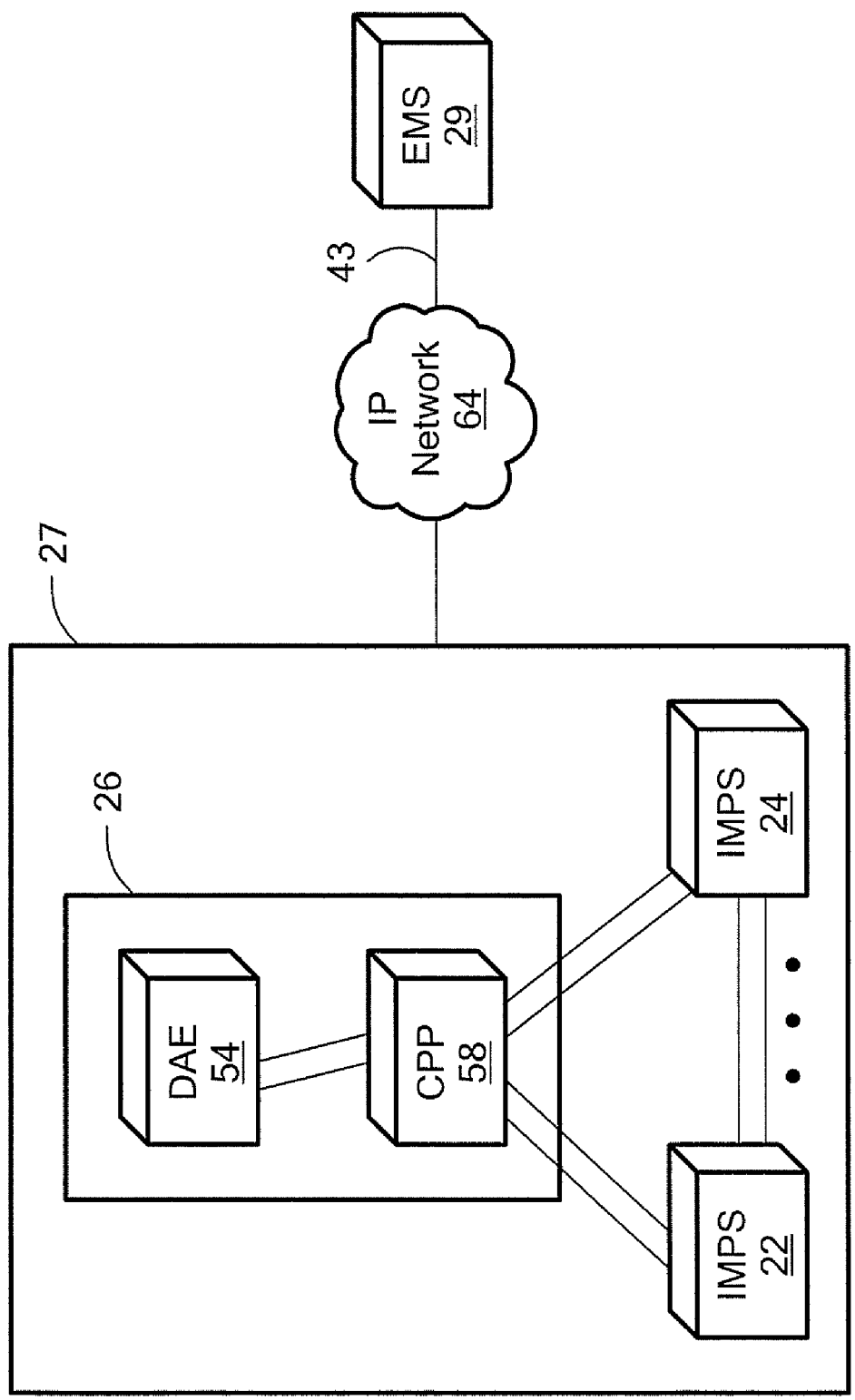
FIG. 2 is another block diagram showing hardware components of the architecture shown in FIG. 1.

Referring to FIG. 2, hardware components of the architecture in the environment shown in FIG. 1 are now described. A FabricX instance 27 is comprised of several discrete hardware subsystems that are networked together. The major subsystems include a Control Path Processor (CPP) 58 and a Disk Array Enclosure (DAE) 54, each described in more detail in FIGS. 3 and 4.

The CPP 58 provides support for storage and switch software applications and runs the software that handles exceptions that occur on the fast-path. Regarding where software runs, in the exemplary embodiment, software for management by the Storage and Switch Controller is shown running on the CPP; however, that is merely an example and any or all software may be loaded and run from the IMPS or anywhere in the networked environment. Additionally the CPP supports management interfaces used to configure and control the instance. The CPP is composed of redundant storage processors and is further described with reference to FIG. 3.

The DAE, together with the disks that it contains provide the persistent storage of the meta-data for the FabricX instance. The meta data includes configuration information that identifies the components of the instance, for example, the identities of the intelligent switches that make up the instance, data describing the set of exported virtual volumes, the software for the Controller, information describing what hosts and initiators are allowed to see what volumes, etc. The DAE is further described with reference to FIG. 4. The IMPS 22 or 24 provide storage virtualization processing in the data-path (also known as fast-path processing), and pass control to the CPP when exceptions occur for requests that it cannot handle.

Each FabricX instance may be managed by an administrator or user using EMS 29. A given EMS can be capable of managing one or more FabricX instances and communicates to the FabricX instance components through one or more IP networks.

Figure 3:
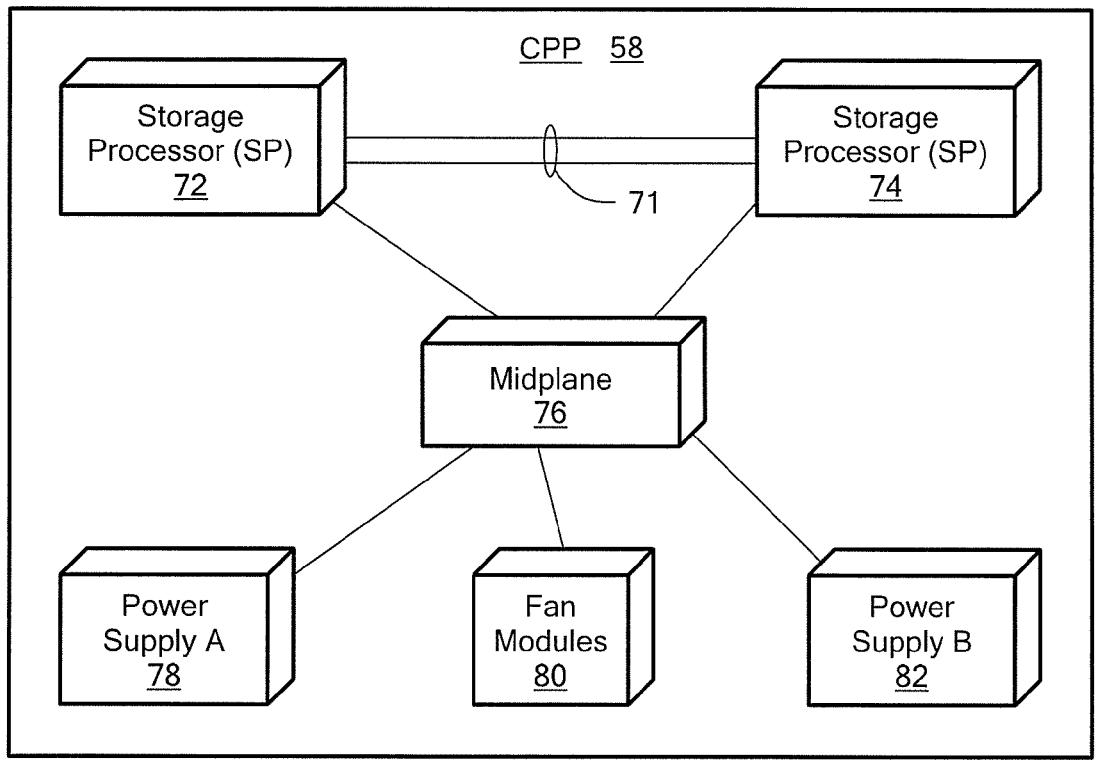
FIG. 3 is another block diagram showing hardware components of a processor included in the architecture and components of respective FIGS. 1 and 2.

Referring to FIG. 3, CPP 58 is shown including first and second storage processors (SP's) 72 and 74, which may be two Intel Pentium IV microprocessors or similar. The two storage processors in the CPP communicate with each other via links 71, which may be for example redundant 2 Gbps Fibre Channel links, each provided in communication with the mid-plane 76. Each CPP contains fan modules 80 that connect directly to the mid-plane 76. The CPP contains two power supplies 78 and 82 (Power Supply A and B). In a preferred embodiment, the power supplies are redundant, have their own line cord, power switch, and status light, and each power supply is capable of providing full power to the CPP and its DAE. During normal operation the power supplies share load current. These redundant standby power supplies provide backup power to the CPP to ensure safety and integrity of the persistent meta-data maintained by the CPP.

Figure 4:
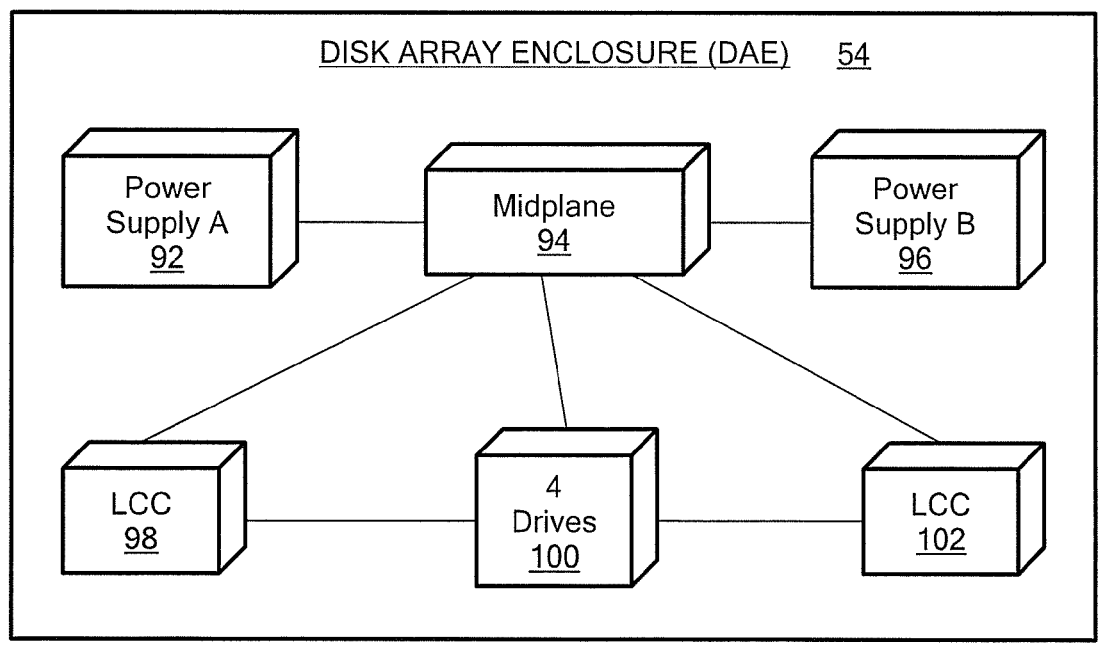
FIG. 4 is another block diagram showing hardware components of a disk array included in the architecture and components of respective FIGS. 1 and 2.

Referring to FIG. 4, the DAE 54 is shown. A FabricX instance 27 preferably has a single DAE 54, which is loaded with four disk drives 100 (the number of drives is a variable choice, however). These disk drives provide the persistent storage for meta-data of the instance, wherein the meta-data is used for certain management and control functions. None of this storage is directly accessible or visible to hosts on the front-end.

It is understood that other configurations for the CPP 58 (FIG. 3) and the DAE 54 (FIG. 4) will be readily apparent to one of ordinary skill in the art to meet the needs of a particular application well within the scope of the invention.

The meta-data on the disk drives is three-way mirrored to provide protection from disk failures. Each SP has a single arbitrated loop that provides its connection to the DAE. Each Link Control Card or LCC 98 and 102 connects the FabricX SP's to the meta-data storage devices or disk drives within the Disk Array Enclosure.

Figure 5:
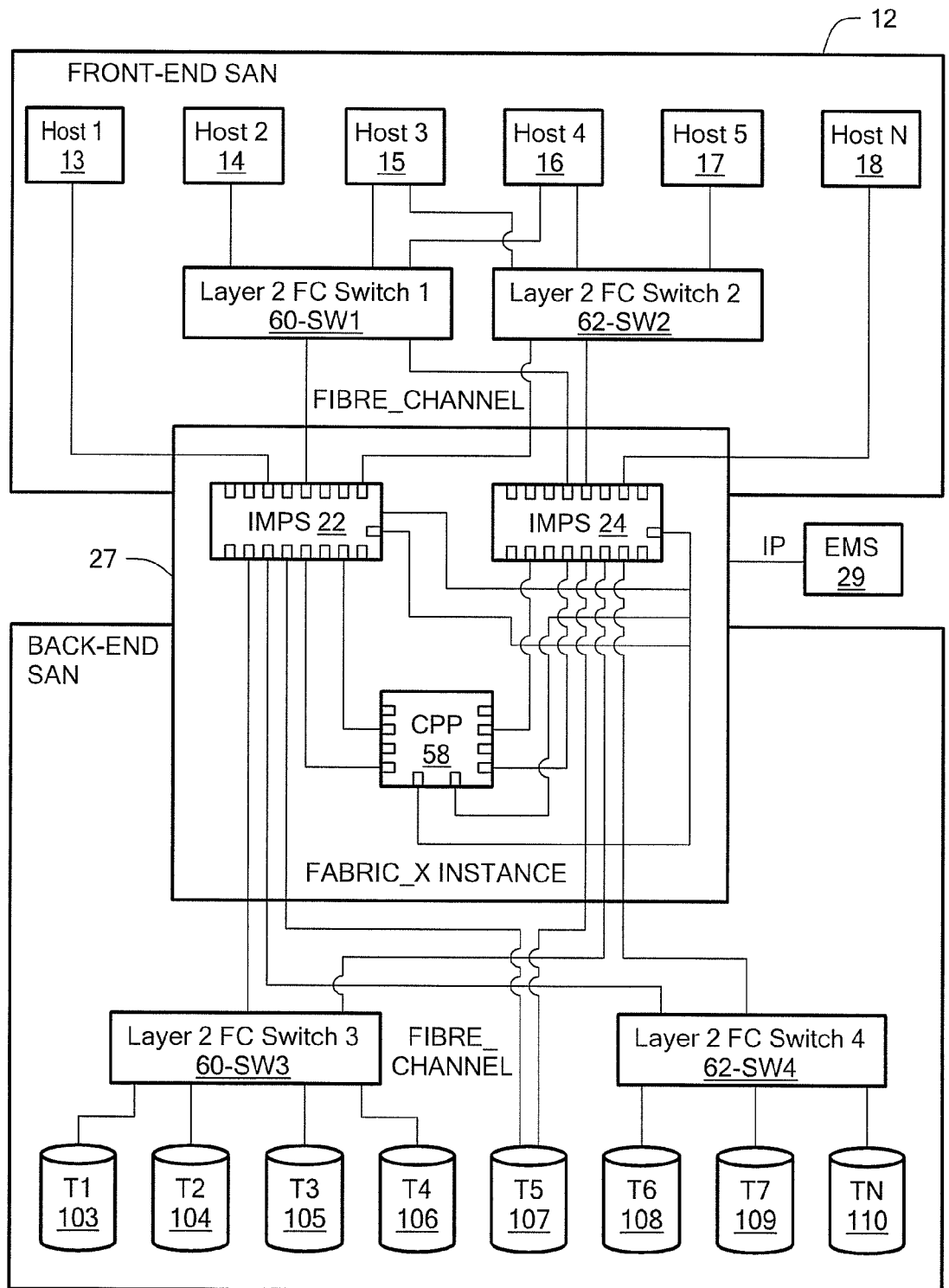
FIG. 5 is a schematic illustration of the architecture and environment of FIG. 1.

FIG. 5 shows a schematic illustration of the architecture and environment of FIG. 1 in detail with connectivity and in a two IMPS configuration (IMPS 22 and IMPS 24). As described in detail below, the system can include switch-initiated trespass commands in accordance with exemplary embodiments of the invention. In the illustrative embodiment, host systems 13-18 communicate with FabricX via a SCSI protocol running over Fibre Channel. Each Fibre Channel port of each IMPS is distinguished as being either a front-end port, a back-end port, a control-port, or an inter-switch port. Hosts connect to the FabricX instance 27 via front-end ports. Front-end ports support SCSI targets and preferably have virtualizing hardware to make up an intelligent port. The host's connection to the port may be direct as in the case of labeled Host 1 or indirect such as Host 2 via layer 2 Fibre Channel switches such as Switch 60-SW1 and Switch 62-SW2. Hosts may establish multiple paths to their storage by connecting to two or more separate front-end ports for high availability and performance; however, the preferred FabricX instance architecture allows hosts to be configured with a single path for the sake of simplicity. In some configurations, not shown for simplicity, the switches 60-SW1 and 62-SW2 could be combined and/or integrated with the IMPS without departing from the spirit of the invention.

An IMPS can be used to support virtual SANs (VSANs), to parse between front-end SANs and back-end SANs even if such SANs are not physically configured. In general, switches that support VSANs allow a shared storage area network to be configured into separate logical SANs providing isolation between the components of different VSANs. The IMPS itself may be configured in accordance with specifications from such known switch vendors as Brocade and Cisco.

Each intelligent switch can contain a collection of SCSI ports, such as Fibre Channel, with translation processing functions that allow a port or associate hardware to make various transformations on the SCSI command stream flowing through that port. These transformations are performed at wire-speeds and hence have little impact on the latency of the command. However, intelligent ports are only able to make translations on read and write commands. For other SCSI commands, the port blocks the request and passes control for the request to a higher-level control function. This process is referred to as faulting the request. Faulting also occurs for read and write commands when certain conditions exist within the port. For example, a common transformation performed by an intelligent port is to map the data region of a virtual volume presented to a host to the data regions of back-end storage elements. To support this, the port maintains data that allows it to translate (map) logical block addresses of the virtual volume to logical back-end addresses on the back-end devices. If this data is not present in the port when a read or write is received, the port will fault the request to the control function. This is referred to as a map fault.

Once the control function receives a faulted request it takes whatever actions necessary to respond to the request (for example it might load missing map data), then either responds directly to the request or resumes it. The control function supported may be implemented differently on different switches. On some vendor's switches the control function is known to be supported by a processor embedded within the blade containing the intelligent ports, on others it is known to provide it as an adjunct processor which is accessed via the backplane of the switch, a third known configuration is to support the control function as a completely independent hardware component that is accessed through a network such as Fibre Channel or IP.

Back-end storage devices connect to FabricX via the Fibre Channel ports of the IMPSs that have been identified as back-end ports (oriented in FIG. 5 toward the back-end SAN). Intelligent ports act as SCSI initiators and the switch routes SCSI traffic to the back-end targets 103-110 respectively labeled T1-TN through the back-end ports of the respective IMPS's. The back-end devices may connect directly to a back-end IMPS if there is an available port as shown by T5, or they may connect indirectly such as in the case of T1 via a layer 2 Fibre Channel switch, such as Switch 60-SW3, and Switch 62-SW4.

The EMS 29 connects to FabricX through an IP network, e.g. an Ethernet network, which may be accessed redundantly. The FabricX CPP 58 in one embodiment has two 10/100 Mbps Ethernet NIC that is used both for connectivity to the IMPS (so that it can manage the IMPS and receive SNMP traps), and for connectivity to the EMS. It is recommended that the IP networks 624*a-b* provided isolation and dedicated 100 Mbps bandwidth to the IMPS and CPP.

The EMS in one embodiment is configured with IP addresses for each Processor 72-74 in the FabricX CPP. This allows direct connection to each processor. Each Processor preferably has its own Fibre Channel link that provides the physical path to each IMPS in the FabricX instance. Other connections may also work, such as the use of Gigabit Ethernet control path connections between the CPP and IMPS. A logical control path is established between each Processor of the CPP and each IMPS. The control paths to IMPSs are multiplexed over the physical link that connects the respective SP of the CPP to its corresponding IMPS. The IMPS provides the internal routing necessary to send and deliver Fiber Channel frames between the SP of the CPP and the respective IMPS. Other embodiments are conceivable that could use IP connectivity for the control path. In such a case the IMPS could contain logic to route IP packets to the SP. Further details of an exemplary system are described in U.S. Pat. No. 7,206,863, which is incorporated herein by reference.

In one aspect of the invention, switch-initiated trespass decisions are made without inter-switch communications. In one embodiment, tie-breaker situations are handled by a default owner mechanism. In one particular embodiment, centralized control for the switches is provided for states in which only passive paths are available so that the system may be 'stuck.'

Figure 6:
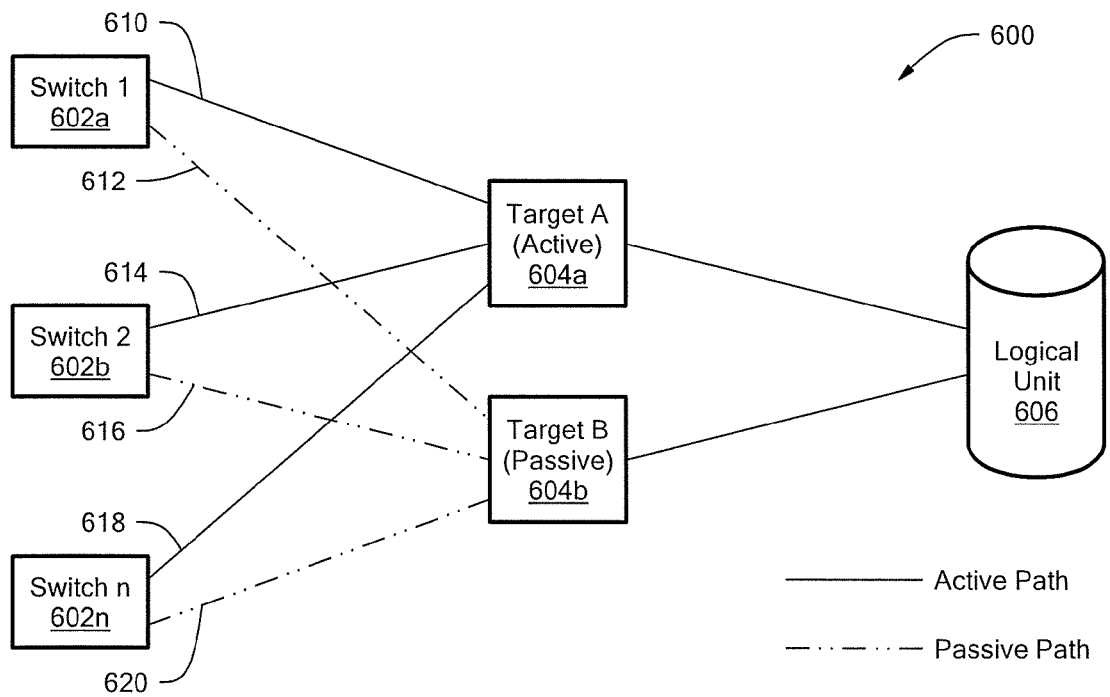
FIG. 6 is a block diagram of switches that can generate trespass commands to targets in accordance with exemplary embodiments of the invention.

FIG. 6 shows an exemplary configuration 600 having a series of switches 602*a*-N coupled to first and second targets 604*a, b*, both of which are connected to a logical unit 606. In an initial configuration, the first switch 602*a* has an active path 610 to the first target 604*a* and an inactive path 612 to the second target 604*b*. Similarly, the second switch 602*b* has an active path 614 to the first target 604*a* and an inactive path 616 to the second target 604*b*, and the third (or n) switch 602*n* has active path 618 to the first target 604*a* and an inactive path 620 to the second target 604*b*.

As used herein a path refers to access from an initiator on a switch 602 to a target 604, such as a SCSI target. A path can be either active or passive, referring to the type of target it refers to. A path is operational if it is capable of communicating between its initiator and target. In exemplary embodiments, a switch 602 refers to a SCSI Switch interposed between a SCSI Initiator and SCSI Target. A target 604 refers to a terminator of a SCSI session to access a logical unit 606. In an exemplary embodiment, a target 604 is a storage processor, such as storage processor 72, 74 in FIG. 3, sitting in front of a given media. The target 604 can either be active (capable of completing I/O for the logical unit) or passive (incapable of completing I/Os for the logical unit). A passive target can be made active by means of a trespass issued by a switch 602. It is expected that this operation will make one or more active targets passive.

Trespass refers to a command given to a passive target for a given logical unit instructing it to become active. Typically, an active target transitioning to passive is drained of outstanding I/O operations prior to trespassing to the currently passive path, which can be referred to as quiescing. In exemplary embodiments, a trespass is typically issued as a type of SCSI command to a backend target. A trespass can also be provided as an autotrespass, i.e., an attempt to do an I/O on a passive path is treated as a trespass request. It is understood that trespass does not limit embodiments to any particular vendor, device, system, etc.

As can be seen, each of the switches 602 has a series of paths to the targets 604 and uses the path(s) to the active target 604a to reach the given logical unit 606. Normally, if a switch 602 runs out of operational paths to an active target 604a, the switch is permitted to issue a trespass to the passive target 604b. Upon completion of the trespass, the other switches will detect the trespass has happened through a variety of implementation-specific ways, e.g., when the I/O to the once-active target fails with a "not ready" SCSI error, monitoring of the targets, etc.). This will be the switches' signal that they need to swap their active and passive paths and use the formerly passive paths to reach the logical unit 606.

A target 604 is also permitted to issue a trespass if it determines a trespass has occurred independently on the backend (for example, upon command from another target), which results in it having no paths to its active target. However, this is subject to some restrictions, as described below, since trespass commands are often relatively time-consuming, e.g., in the order of several seconds, The rules enumerated above permit the switches 602 to perform trespass operations independently from one another. However, it is desirable to prevent a situation in which two (or more) switches constantly ping-pong trespasses.

Figure 7:
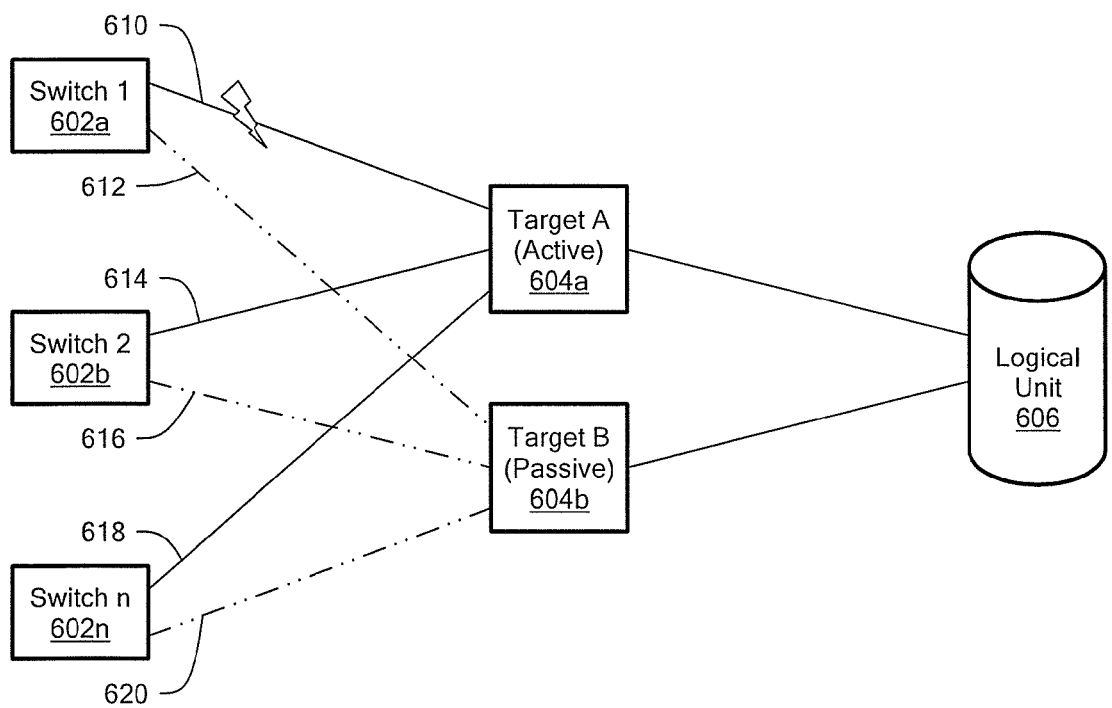
FIGS. 7-10 are block diagrams showing an exemplary sequence of trespass command generation.

FIG. 7 shows the first switch 602a losing its connection 610 to the first target 604a. However, the first switch 602a it recognizes it has at least one path 612 to the second target 604b. The first switch 602a issues a trespass command to the second target 604b.

Figure 8:
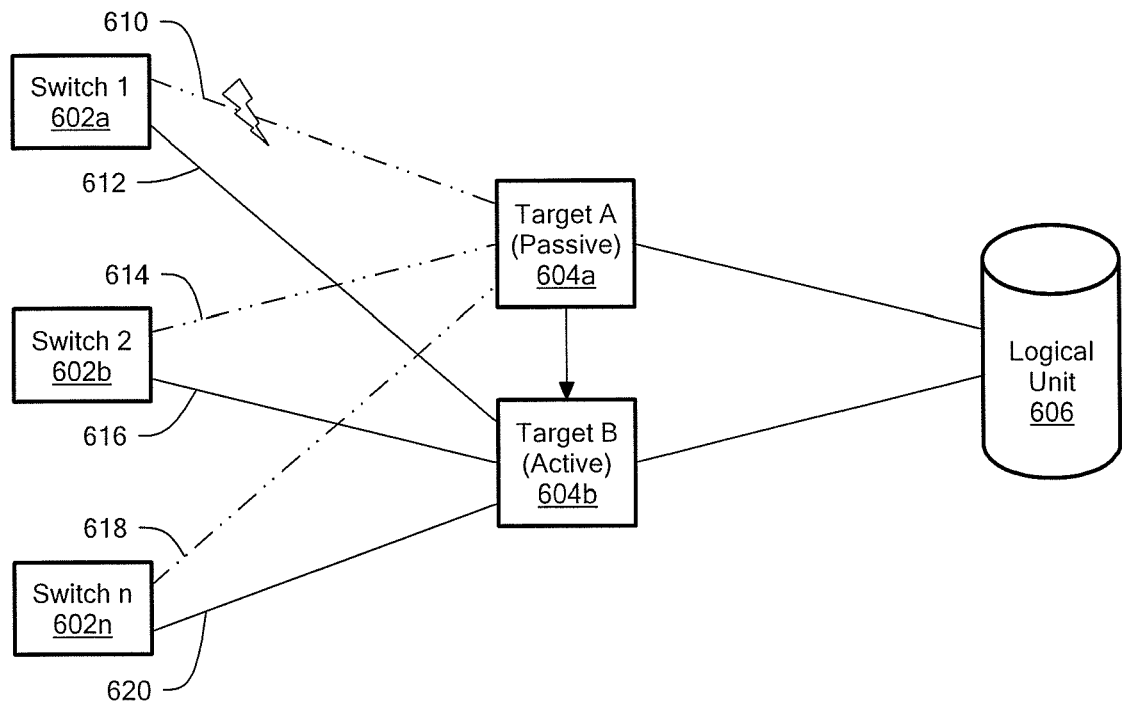

FIG. 8 shows the result from the trespass command. At the conclusion of this operation the other switches 602b-n detect this condition and adjust their path configurations. That is, paths to the second target 604b become active.

Figure 9:
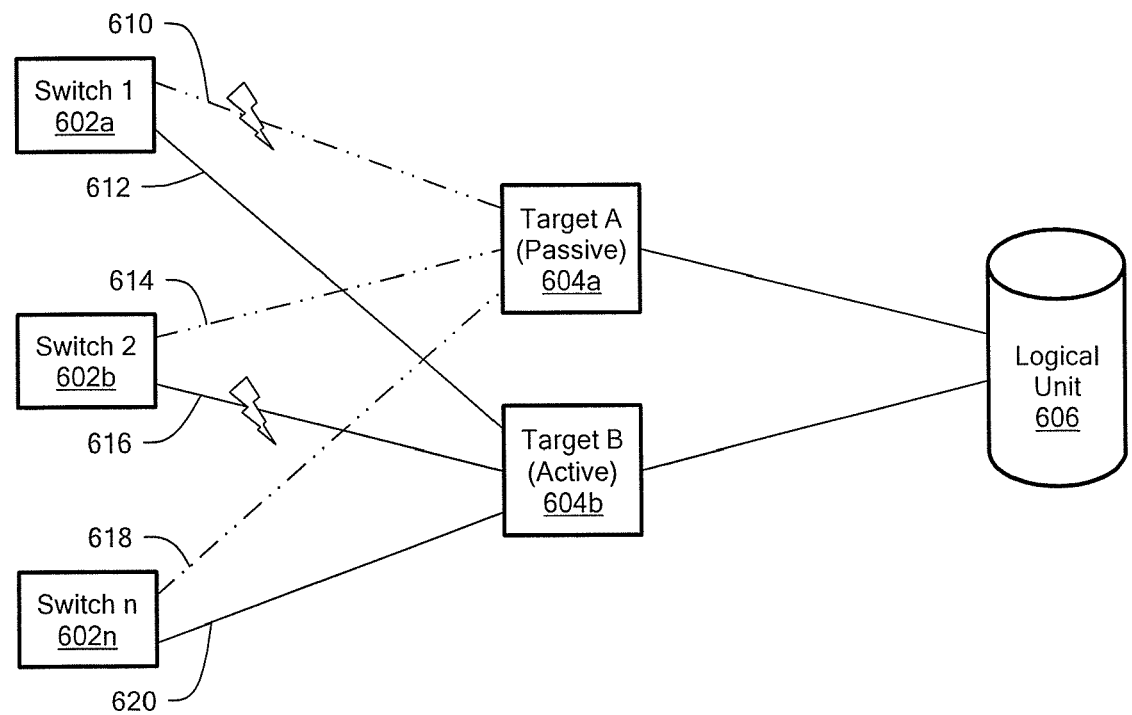
Figure 10:
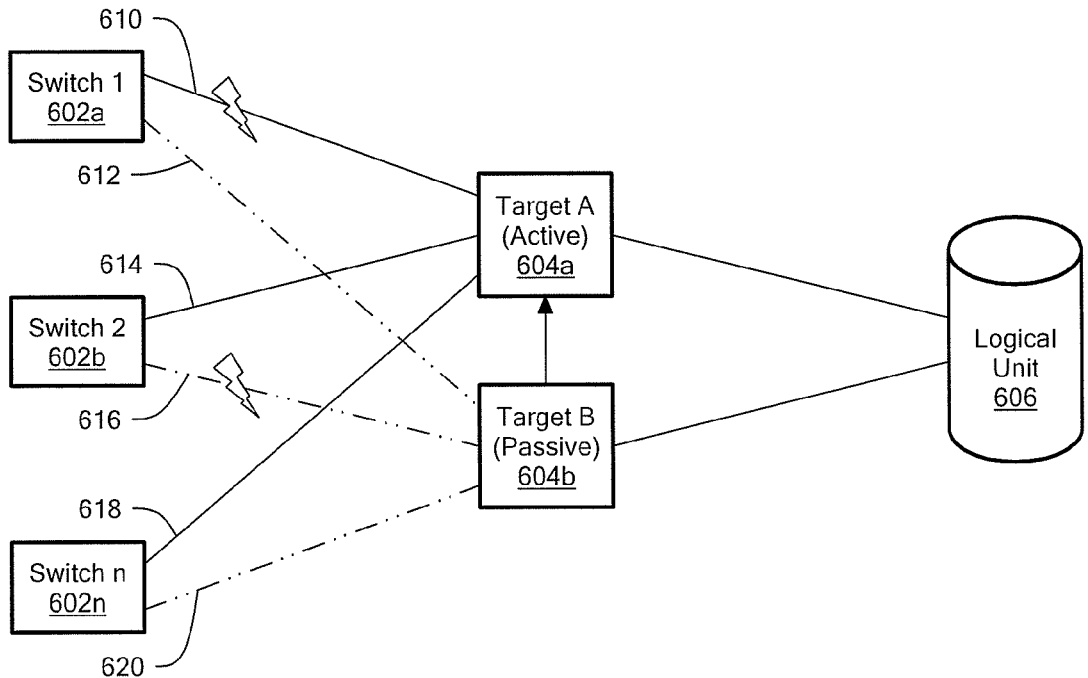

However, with another path failure, shown as path 616 in FIG. 9, the second switch 602b may issue a trespass command to the first target 604a, as shown in FIG. 10. As a result, the first switch 602a determines that it has no active paths to the first target 604a and therefore desires to issue a trespass to the second target 604b. This will, however, cause problems for the second switch 602b.

In an exemplary embodiment, a tie-breaking mechanism addresses the above. In one embodiment, the mechanism includes the ability, for any given logical unit, that one of the targets can exclusively identify itself to the switches as the default owner. This can be accomplished in variety of ways, such as the default owner being set by a storage administrator and stored by the targets in some shared nonvolatile memory where the target identifies itself to the switches accordingly. In addition, the mechanism can include a trespass window, which is designated as some time interval that is significantly greater than the amount of time it is expected for a trespass operation to complete.

In an exemplary embodiment, when a given switch sees that it needs to issue a trespass to a given target, it is allowed to issue the trespass command if either of the following conditions is true: 1) the trespass command is to be given to the default owner; or, 2) a trespass has not been performed within the trespass window.

Whenever a switch either receives acknowledgement that a trespass command it issued has been successfully completed OR it detects another switch has issued a trespass command (for example by seeing the paths it considers active becoming passive) it shall record the current time so that it can use that as a starting point for the Trespass Window.

Figure 11:
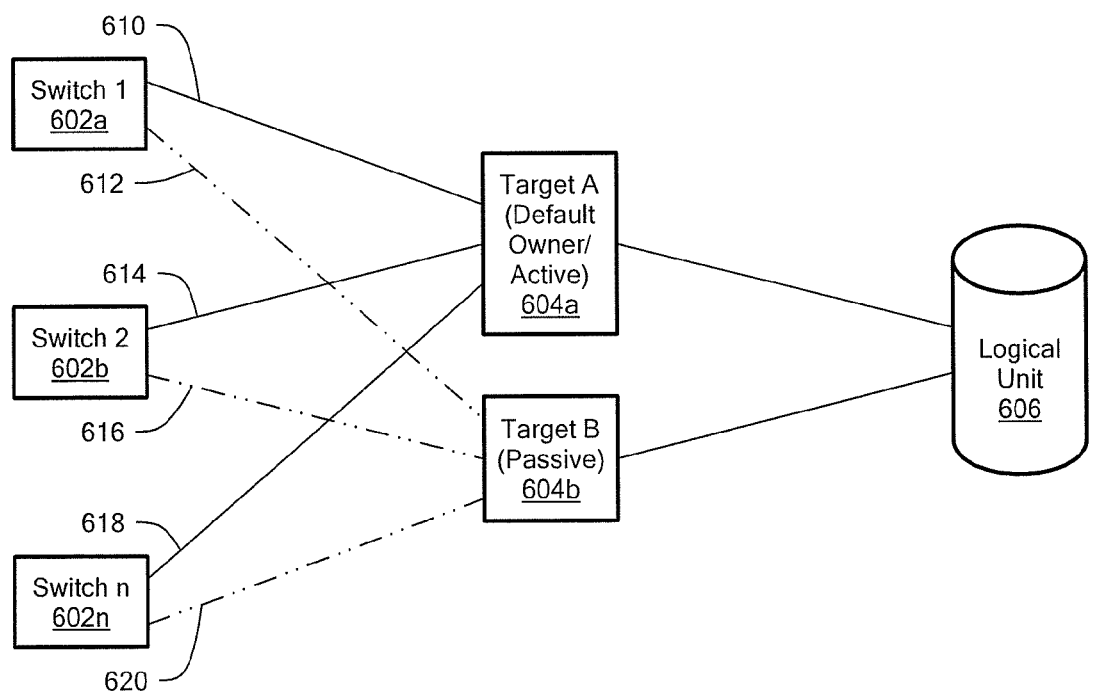
FIGS. 11-15 shows a further exemplary sequence of trespass command generation.

The following figures illustrate the same sequence of events discussed in above. For this sequence, it is assumed that the first target 604a is the default owner, as illustrated in FIGS. 11-15, where FIG. 11 is similar to the initial state shown in FIG. 6 with the addition of the first target 602a as the default owner.

Figure 12:
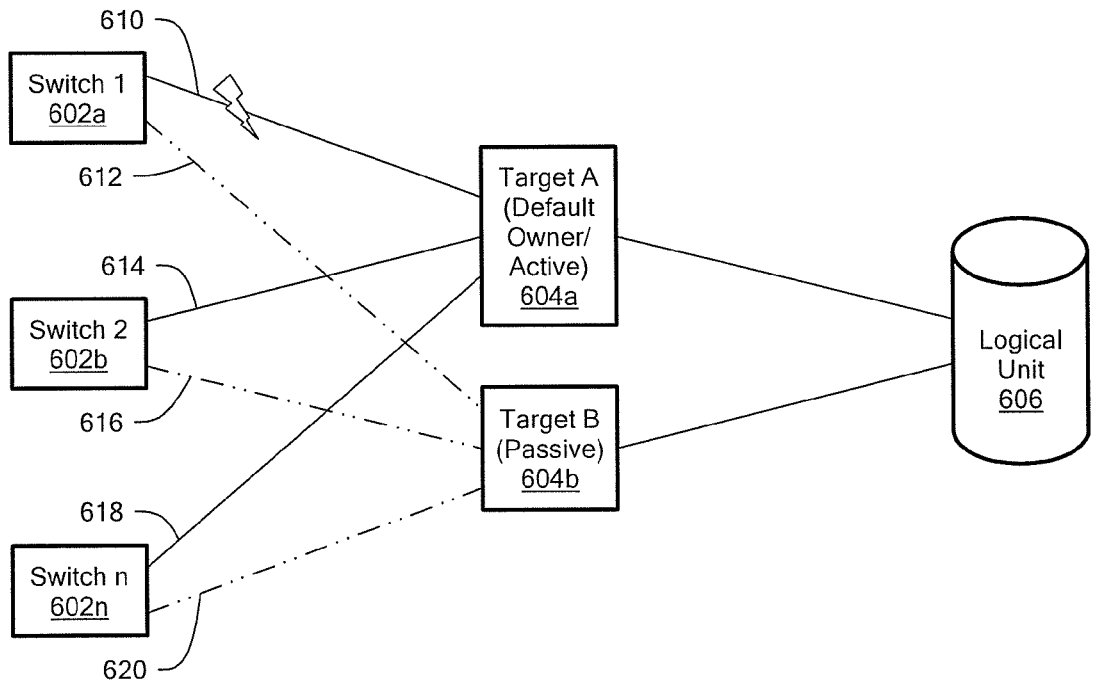
Figure 13:
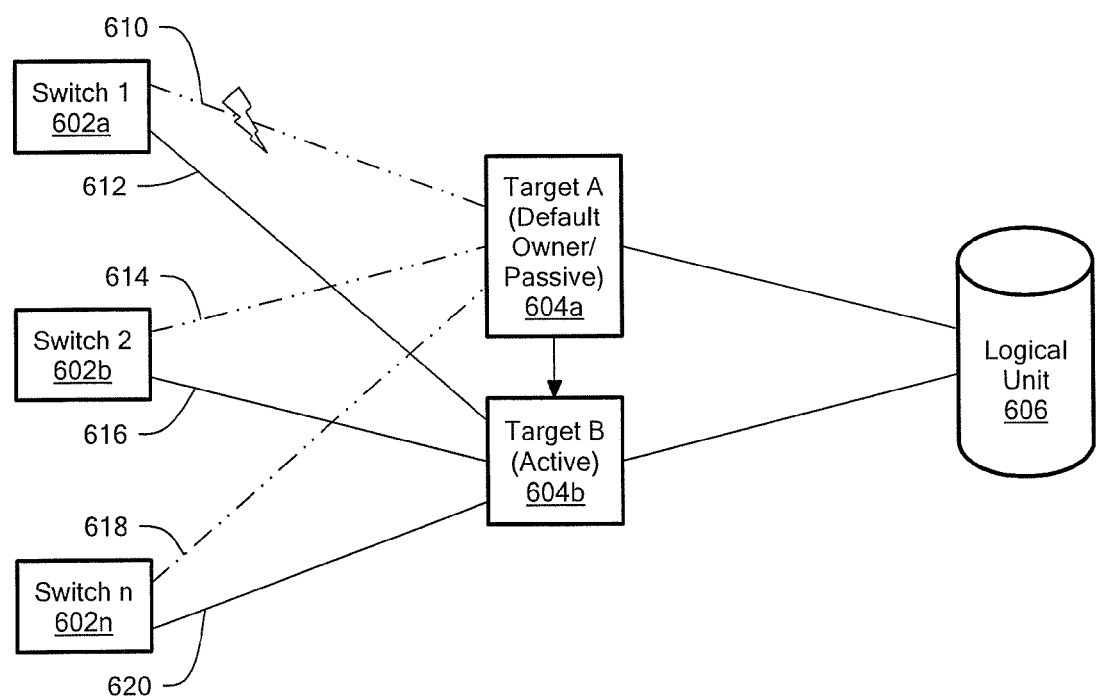
Figure 14:
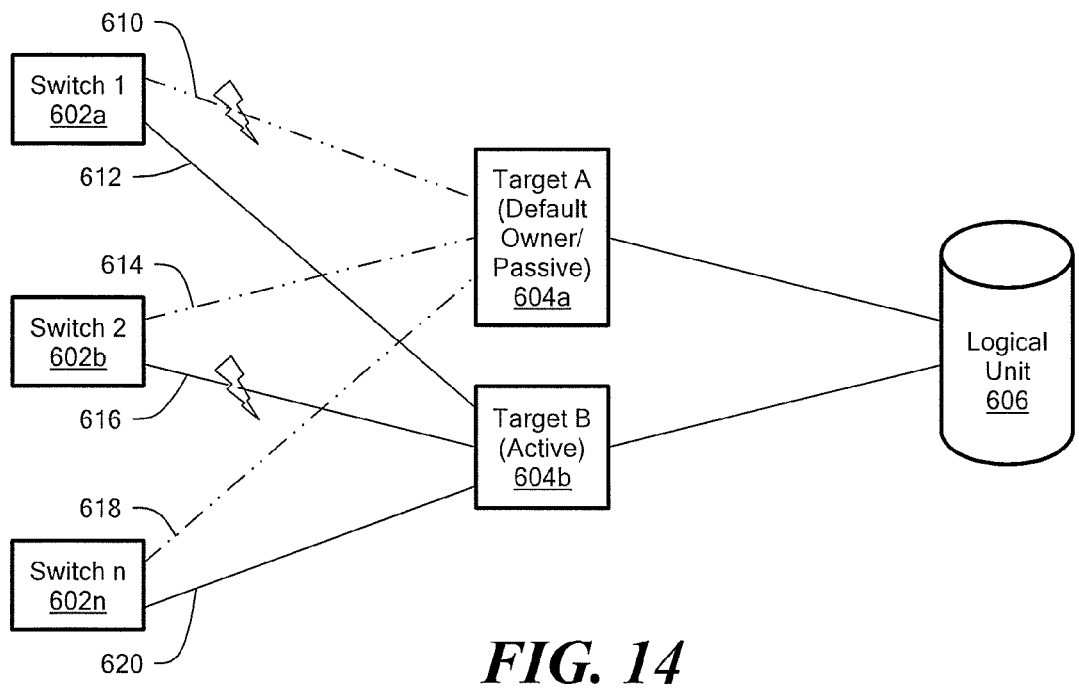
Figure 15:
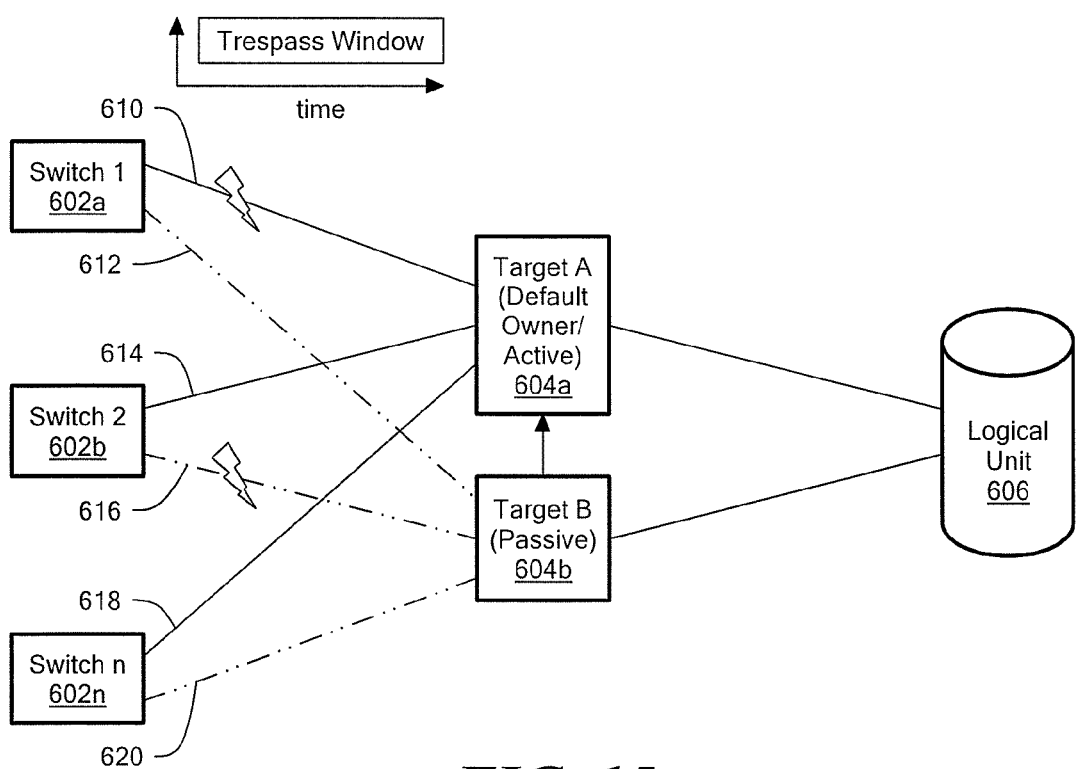

The sequence described immediately above is similar to the first sequence (FIGS. 6-10). In FIG. 12, the first switch 602a loses the active path 610 to the first target 604a (default owner). In FIG. 13, the first switch 602a issues a trespass command to the second target 604b (non-default owner). In FIG. 14, the second switch 602b loses the path to the second target 604b. In FIG. 15, the second switch 602b issues a trespass command to the first target 604a (default owner).

In this scenario when the first switch 602a discovers that its I/O to the second target 604b is to a target that is not the owner, it will not attempt to issue a trespass command to the second target 604b, assuming that it is within the trespass window.

Figure 16:
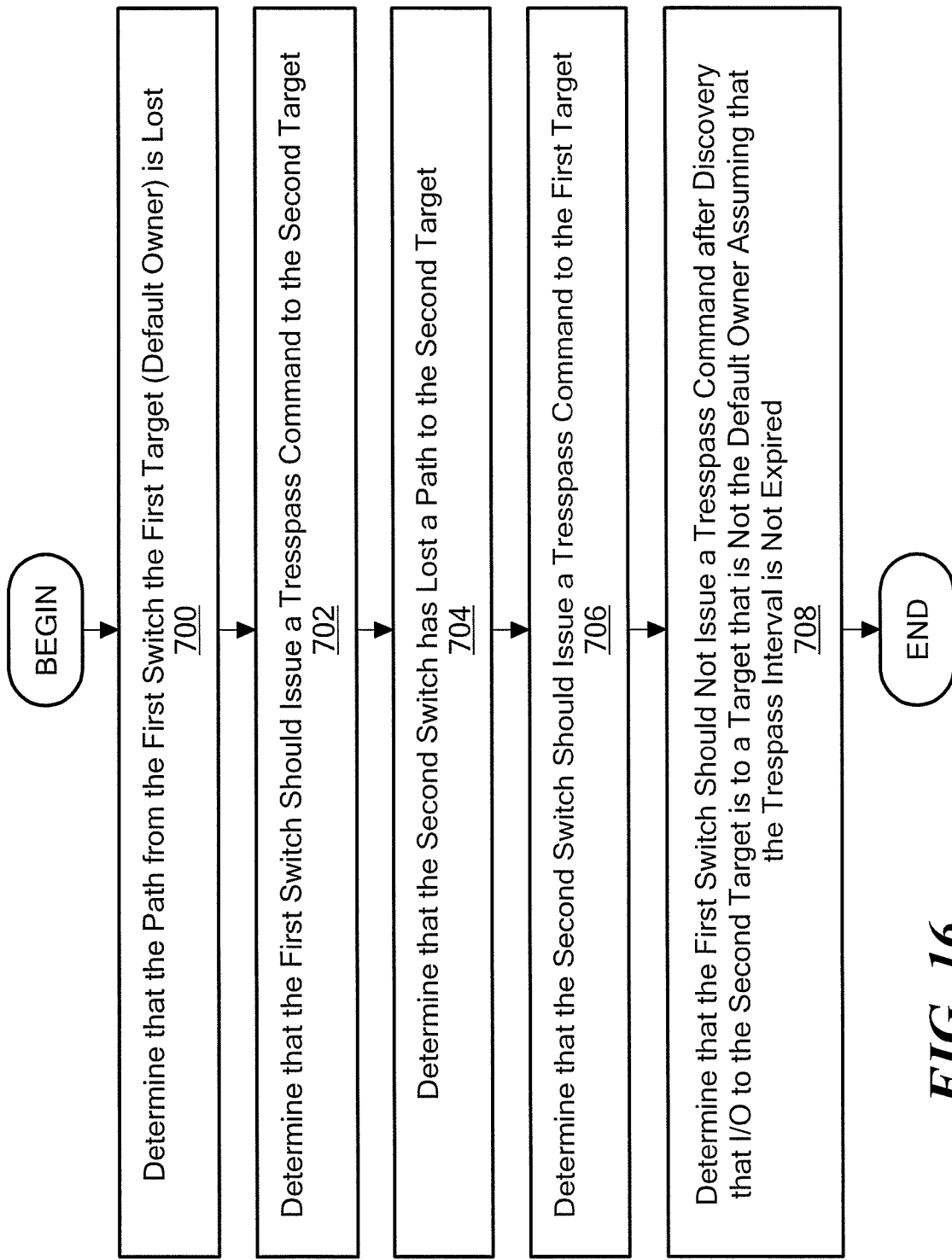
FIG. 16 is a flow diagram showing exemplary trespass command generation in accordance with exemplary embodiments of the invention.

FIG. 16 shows an exemplary sequence of steps for implementing switch/target path control in accordance with exemplary embodiments of the invention. It is understood that the exemplary steps correspond to the scenario described above. It will be readily apparent that a wide variety of alternate scenarios are possible with a different path interruption, switch type and number, target type and number, and logical unit type and number, that are well within the scope of the invention.

In step 700, it is determined that the path from the first switch 602a the first target 604a (default owner) is lost. In step 702, it is determined that the first switch 602a should issue a trespass command to the second target 604b. It is determined in step 704 that the second switch has lost a path to the second target 604b. In step 706, it is determined that the second switch 604b should issue a trespass command to the first target 602a. In step 708, it is determined that the first switch 602a should not issue a trespass command after discovery that I/O to the second target is to a target that is not the default owner assuming that the trespass interval is not expired.

If a switch enters a state in which it has no active paths remaining, it must periodically poll to see if either of the following conditions has arisen: 1) a target that it considers as passive has become active; and/or 2) it again has a connection to a target that it has lost.

Figure 17:
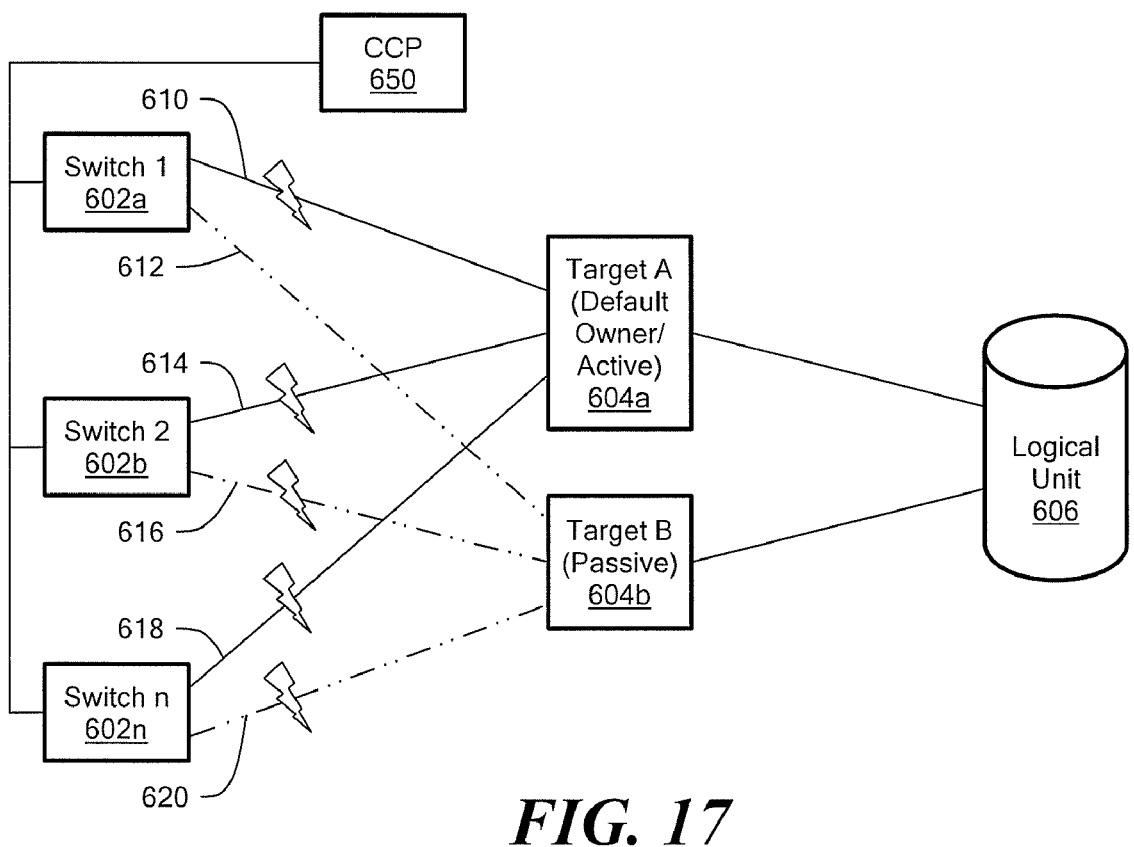
FIG. 17 is a block diagram showing switch communication with an optional central coordination point in accordance with exemplary embodiments of the invention.

While the processing described above is designed to operate with neither interswitch communication nor a central coordination point, there does exist a possible, although unlikely, condition that could result in an avoidable data unavailability. Suppose a setup has reached the condition shown in FIG. 17 where all paths except a passive path from the first switch 602a to the second target is available. Then suppose a failure sequence occurs which causes the following conditions: 1) no switch has operating paths to both active and passive targets; and/or 2) all paths to active paths have failed.

For example, assume only the first switch 602a has the only possible route to reach the logical unit 606, but this requires the switch to issue a trespass to the second target 604b. However, even if the trespass window were to expire (allowing a trespass to a non-default owner), there would never be an I/O that will trigger the trespass (as it has only passive paths and will therefore not attempt any I/O).

In this scenario, a central coordination point or module 650 becomes capable of giving a switch the needed push to perform a trespass. The 'push' can operate under the following restrictions. Whenever a switch transitions to or from zero paths to an active target for a logical unit it shall inform the central coordination point. This shall be sent after any pending trespasses are completed for a given logical unit on a given switch. In addition, whenever a switch transitions to or from zero paths to a passive target for a logical unit it shall inform the central coordination point. This shall be sent after any pending trespasses are completed for a given logical unit on a given switch. Also, when the central coordination point 650 sees that a condition has arisen where no switch has operating paths to an active target for a logical unit, but one or more switches have operating paths to a passive target for a logical unit, it shall instruct one of those switches to issue a trespass to the passive target. The switch may not refuse this instruction. Only one trespass command need be issued by the central coordination point—any other switches with operating paths to just passive targets will detect this trespass has occurred by their periodic polling, as described above.

Figure 18:
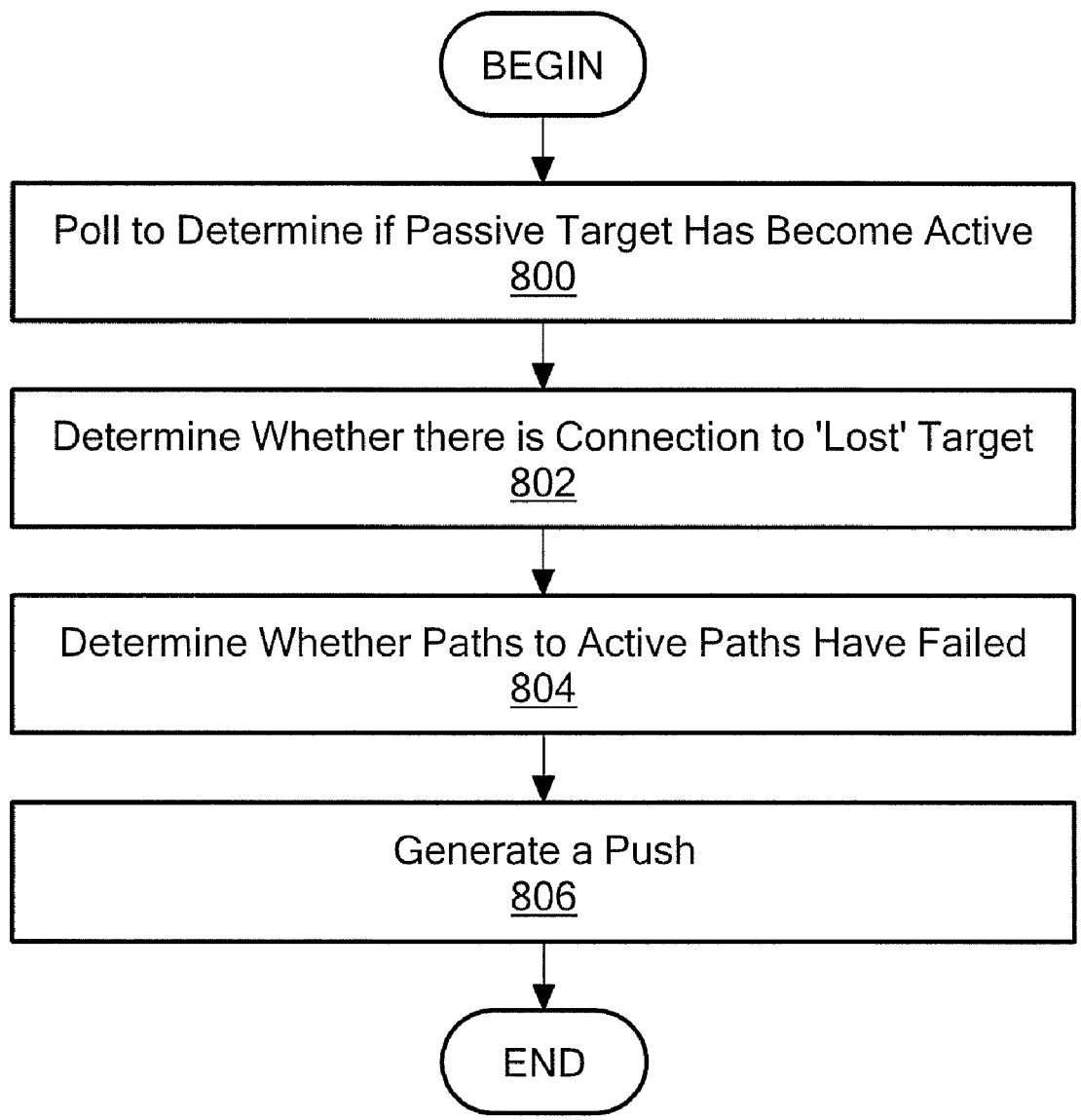
FIG. 18 is a flow diagram showing switch polling to generate a push command.

FIG. 18 shows an exemplary sequence of steps providing some control for the trespass command generation. In step 800, a switch polls to determine whether a passive target has become active. In step 802, the switch determines whether it has a connection to a lost target. Where an optional central control point is provided, in step 804, it is determined whether any switch has operating paths to active and passive targets. In step 806, it is determined whether all paths to active paths have failed. The central coordination point 650 (FIG. 17) provides a 'push' to transition out of this state.

In an exemplary embodiment, prior to a push being generated, the intelligent switches inform the controller 650 as they enter and leave the following states:

1) no paths;
2) no active paths (i.e. at least one passive path); and
3) at least one active path.

When the controller 650 determines that there are no switches in state (3) above and at least one switch in state (2) it is authorized to force a trespass. This involves instructing all switches to perform a trespass for the given target. As noted above, the intelligent switches are not at liberty to refuse this command, though they may not be able to perform as instructed. As each target receives the trespass command it will reset its trespass window and, if possible, instruct the backend target to trespass. The switches will indicate success if any of them inform the controller that it has transitioned to state (3) above.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
recognizing a first switch having a first path to a first target, which is coupled to a logical unit, and a second path to a second target;
recognizing a second switch having a first path to the first target and a second path to the second target, the second target being coupled to the logical unit;
wherein in a first state the first path from the first switch to the first target is active, the second path from the first switch to the second target is passive, the first path from the second switch to the first target is active and the second path from the second switch to the second target is passive,
identifying to the first and second switches that the first target is a default owner for the logical unit;
determining that the first path from the first switch to the first target is lost;
determining that the first switch should issue a trespass command to the second target, if the first path from the first switch to the first target is lost, to enable the first paths to the first target to become inactive and the second paths to the second target to become active;
generating a trespass window from the trespass command, the trespass window being a time interval that is greater than an amount of time expected for a trespass operation to complete;
determining that the second path from the second switch to the second target is lost; and
determining whether the first switch should issue a trespass command to the second target based upon whether the trespass window is expired and the identifying of the default owner,
wherein a trespass command instructs a passive target for the logical unit to become active.

2. The method according to claim 1, determining whether a central controller should generate a push command in response to one or more conditions.

3. The method according to claim 2, wherein the one or more conditions includes the first and second switches having no operating paths to both active and passive targets, and/or all paths to active paths have failed.

4. The method according to claim 2, wherein the first switch informs the central controller as the first switch enters and leave states including no paths, no active paths, and at least one active paths.

5. The method according to claim 2, where the central controller issues a push command including commands to the first and second switches to perform a trespass.

6. The method according to claim 1, wherein the first target includes a SCSI target.

7. The method according to claim 1, wherein the first target includes a storage processor.

8. The method according to claim 1, wherein the default owner is set by a storage administrator.

9. The method according to claim 1, further including communicating to the first switch that the first target is the default owner.

10. The method according to claim 1, further including recording a current time as a starting point for the trespass window in response to a first one of receiving an acknowledgement a trespass command has been successfully completed and detecting a different switch has issued a trespass command.

11. The method according to claim 1, further including, prior to generating the push, detecting that the first switch has no active paths and polling to determine whether the passive second target has become active, and polling to determine if the first switch has a connection to a lost target.

12. A system, comprising:
a first switch having a first path to a first target, which is coupled to a logical unit, and a second path to a second target;
a second switch having a first path to the first target and a second path to the second target, the second target being coupled to the logical unit;
wherein in a first state the first path from the first switch to the first target is active, the second path from the first switch to the second target is passive, the first path from the second switch to the first target is active and the second path from the second switch to the second target is passive,
wherein the first and second switches are capable of recognizing that the first target is a default owner for the logical unit, that the first path from the first switch to the first target is lost, that the first switch should issue a trespass command to the second target, if the first path from the first switch to the first target is lost, to enable the first paths to the first target to become inactive and the second paths to the second target to become active, that the second path from the second switch to the second target is lost, and whether the first switch should issue a trespass command to the second target based upon whether a trespass window is expired and the identifying of the default owner,
wherein the trespass window is a time interval that is greater than an amount of time expected for a trespass operation to complete,
wherein a trespass command instructs a passive target for the logical unit to become active.

13. The system according to claim 12, wherein the system further includes a central controller to generate a push command to the first and second switches.

14. The system according to claim 13, wherein the push command includes commands to the first and second switches to perform a trespass.

15. An article, comprising:
a storage medium having stored thereon instructions that when executed by a machine result in the following:
recognizing a first switch having a first path to a first target, which is coupled to a logical unit, and a second path to a second target;
recognizing a second switch having a first path to the first target and a second path to the second target, the second target being coupled to the logical unit;
wherein in a first state the first path from the first switch to the first target is active, the second path from the first switch to the second target is passive, the first path from the second switch to the first target is active and the second path from the second switch to the second target is passive,
identifying to the first and second switches that the first target is a default owner for the logical unit;
determining that the first path from the first switch to the first target is lost;
determining that the first switch should issue a trespass command to the second target, if the first path from the first switch to the first target is lost, to enable the first paths to the first target to become inactive and the second paths to the second target to become active;
generating a trespass window from the trespass command, the trespass window being a time interval that is greater than an amount of time expected for a trespass operation to complete;
determining that the second path from the second switch to the second target is lost; and
determining whether the first switch should issue a trespass command to the second target based upon whether the trespass window is expired and the identifying of the default owner,
wherein a trespass command instructs a passive target for the logical unit to become active.

16. The article according to claim 15, further including instructions for determining whether a central controller should generate a push command in response to one or more conditions.

17. The article according to claim 16, wherein the one or more conditions includes the first and second switches having no operating paths to both active and passive targets, and/or all paths to active paths have failed.

18. The method of claim 1 further comprising determining that the second switch should issue a trespass command to the first target, if the second path from the second switch to the second target is lost, to enable the first paths to the first target to become active and the second paths to the second target to become inactive.

19. The system of claim 12 wherein the first and second switches are further capable of recognizing whether the second switch should issue a trespass command to the first target, if the second path from the second switch to the second target is lost, to enable the first paths to the first target to become active and the second paths to the second target to become inactive.

20. The article of claim 15 further comprising instructions that result in determining that the second switch should issue a trespass command to the first target, if the second path from the second switch to the second target is lost, to enable the first paths to the first target to become active and the second paths to the second target to become inactive.

* * * * *